(12) United States Patent
Szwedowicz et al.

(10) Patent No.: US 9,022,726 B2
(45) Date of Patent: May 5, 2015

(54) THERMALLY LOADED, COOLED COMPONENT

(75) Inventors: Jaroslaw Leszek Szwedowicz, Zurzach (CH); Stefan Irmisch, Oberrohrdorf (CH)

(73) Assignee: Alstom Technology Ltd, Baden (CH)

( * ) Notice: Subject to any disclaimer, the term of this patent is extended or adjusted under 35 U.S.C. 154(b) by 772 days.

(21) Appl. No.: 13/167,819

(22) Filed: Jun. 24, 2011

(65) Prior Publication Data

US 2011/0318191 A1 Dec. 29, 2011

(30) Foreign Application Priority Data

Jun. 25, 2010 (CH) ...................................... 1040/10

(51) Int. Cl.
F01D 5/18 (2006.01)
(52) U.S. Cl.
CPC .......... *F01D 5/187* (2013.01); *F05D 2260/963* (2013.01); *Y02T 50/676* (2013.01); *F05D 2260/221* (2013.01)
(58) Field of Classification Search
USPC ....... 165/109.1, 168, 908; 415/115; 416/97 R
See application file for complete search history.

(56) References Cited

U.S. PATENT DOCUMENTS

| | | | |
|---|---|---|---|
| 3,359,737 A | 12/1967 | Lewis | |
| 5,339,640 A * | 8/1994 | Reinke | 62/6 |
| 5,508,477 A * | 4/1996 | Kato et al. | 181/205 |
| 7,080,514 B2 * | 7/2006 | Bland et al. | 60/725 |
| 7,249,934 B2 * | 7/2007 | Palmer et al. | 416/97 R |
| 7,607,287 B2 * | 10/2009 | Reba et al. | 60/226.1 |
| 8,127,546 B2 * | 3/2012 | Park | 60/725 |
| 8,413,443 B2 * | 4/2013 | Johnson | 60/725 |
| 8,635,874 B2 * | 1/2014 | Eroglu et al. | 60/725 |
| 8,714,302 B2 * | 5/2014 | Gradinger et al. | 181/225 |
| 2002/0018717 A1 * | 2/2002 | Dailey | 416/97 R |
| 2006/0123791 A1 | 6/2006 | MacQuisten et al. | |
| 2006/0196638 A1 * | 9/2006 | Glezer et al. | 165/80.3 |
| 2009/0277180 A1 | 11/2009 | Lam | |
| 2010/0018675 A1 * | 1/2010 | Aarts et al. | 165/104.19 |
| 2010/0043387 A1 * | 2/2010 | Myers et al. | 60/39.281 |
| 2010/0068066 A1 | 3/2010 | Bunker | |
| 2011/0318191 A1 * | 12/2011 | Szwedowicz et al. | 416/97 R |
| 2012/0186271 A1 * | 7/2012 | Tousain et al. | 62/3.1 |

(Continued)

FOREIGN PATENT DOCUMENTS

EP 0 577 862 A1 1/1994
EP 0678715 A1 10/1995

(Continued)

OTHER PUBLICATIONS

Machine translation of RU 2028456 C1 from EPO.*

(Continued)

*Primary Examiner* — Edward Look
*Assistant Examiner* — Christopher R Legendre
(74) *Attorney, Agent, or Firm* — Buchanan Ingersoll & Rooney PC

(57) ABSTRACT

A thermally loaded, cooled component thermally coupled to a cooling system configured to receive a gaseous cooling introduced in a forced manner from outside that flows through the cooling system so as to absorb and transport heat away from the component as a result of thermal contact with the component. The component includes at least one Helmholtz resonator configured to improve thermal contact between the cooling medium and the component.

8 Claims, 2 Drawing Sheets

(56) References Cited

U.S. PATENT DOCUMENTS

2012/0198854 A1* 8/2012 Schilp et al. .................... 60/755
2013/0313959 A1* 11/2013 Kerber et al. ................... 313/46

FOREIGN PATENT DOCUMENTS

| EP | 0 971 172 A1 | 1/2000 |
| EP | 1 669 670 A1 | 6/2006 |
| EP | 2116770 A1 | 11/2009 |
| RU | 2 028 456 C1 | 2/1995 |

OTHER PUBLICATIONS

Machine translation of RU 2028456 C1 (Feb. 9, 1995) from EPO.*
European Patent Office, Examination Report in European Patent Application No. 11 16 9589 (Oct. 13, 2011)
European Patent Office, First Examination Report in Swiss Patent Application No. 10402010 (Oct. 8, 2010).
European Search Report issued Jan. 5, 2015 by the European Patent Office in corresponding European Application No. 11 169 589.6.

* cited by examiner

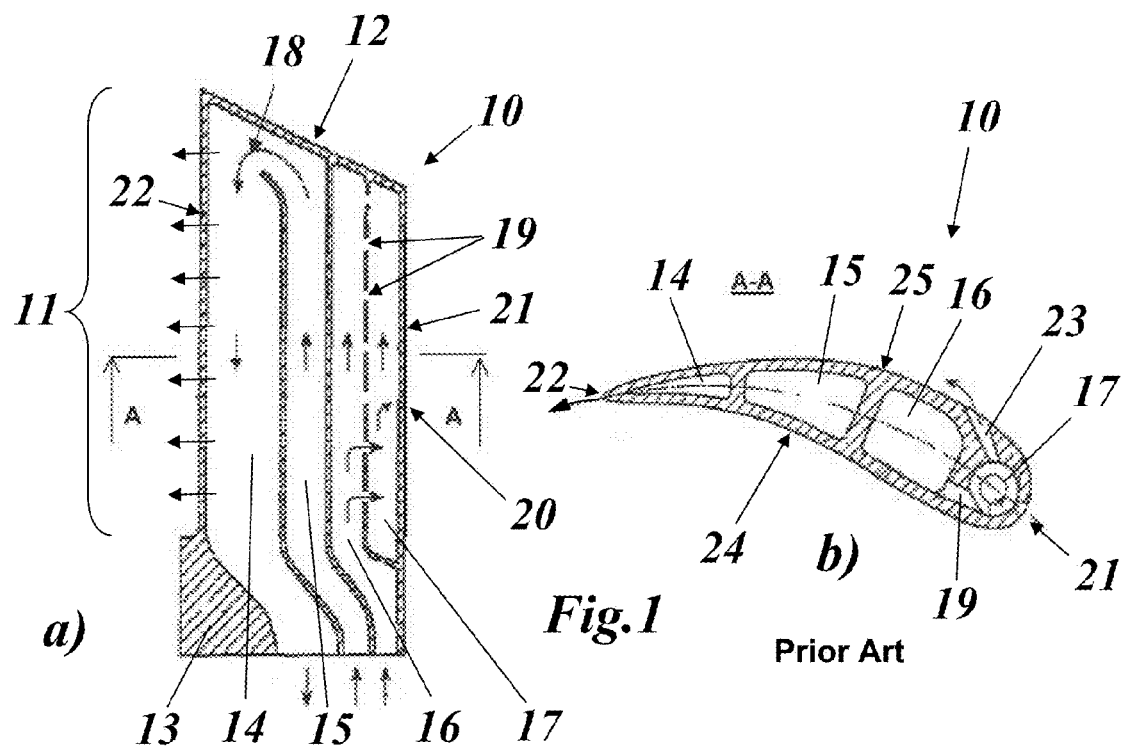
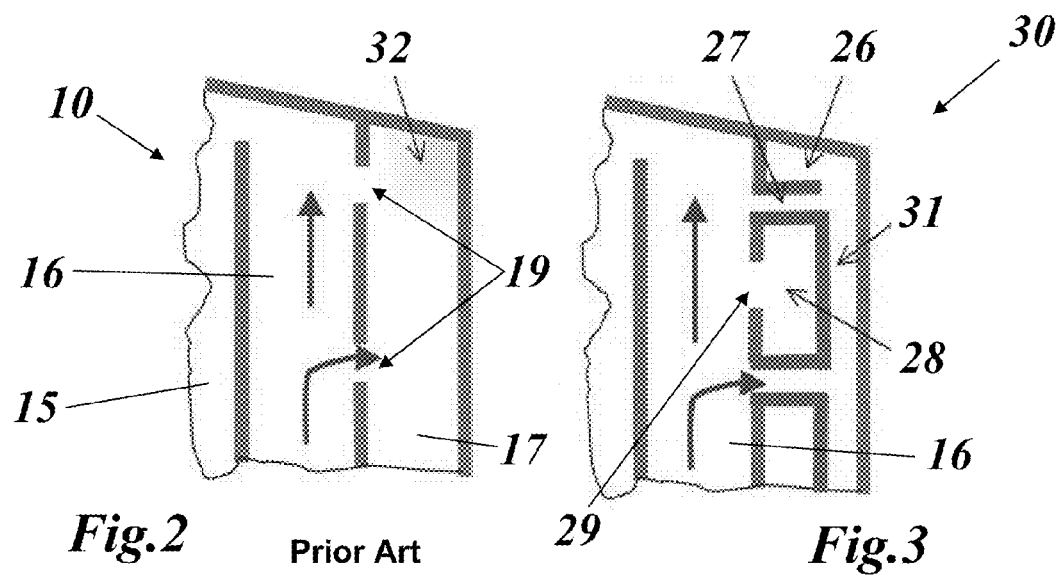

THERMALLY LOADED, COOLED COMPONENT

CROSS REFERENCE TO RELATED APPLICATIONS

This application claims priority to Swedish Patent Application No. 01040/10, filed Jun. 25, 2011, which is hereby incorporated by reference herein in its entirety.

TECHNICAL FIELD

The present invention relates to the field of cooling of thermally loaded components.

BACKGROUND OF THE INVENTION

An effective cooling of gas-turbine components which come into contact with the hot gas of the turbine, such as rotor blades, stator blades or combustor parts, is an important element for controlling the service life and the performance of the machine. Thus, for example air, which is tapped off at the compressor and guided to the hottest points of the gas turbine, is directed through the rotor and the casing. In this way, hot regions of the rotor and of the casing are also cooled, which particularly in the case of the latest generations of high-performance gas turbines is absolutely necessary for these components for achieving the desired service life. In this sense, the tapped-off air fulfills two tasks: it reduces the metal temperatures in the rotor and casing to an acceptable level and then cools components which are exposed to the hot gas, such as turbine blades and combustor parts. The same also applies to other cooling media such as steam which has to be produced specially for cooling purposes or is tapped off from an already existing steam cycle of a combined cycle power plant or from a separate steam boiler. The tapped-off cooling medium is either lost—in an open cooling system—or is returned to the steam cycle—in a closed cooling cycle, wherein, however, some energy losses typically arise.

When designing cooling systems, it is the aim
- to reduce the amount of cooling medium which comes from the compressor, from the steam generator, or from another source for the cooling medium; and
- to increase the cooling efficiency of the cooling medium, which for example flows through internal cooling passages.

As an example for such cooling, a turbine blade 10 is shown in FIG. 1. Sub-figure 1*a*) shows the longitudinal section through the turbine blade 10 and sub-figure 1*b*) shows the cross section in the plane A-A from FIG. 1*a*). The turbine blade 10 has a lower part 13 and a blade airfoil 11 which is connected thereto in the radial direction and terminates in a blade tip 12. The blade airfoil 11 customarily has a leading edge 21, a trailing edge 22, and also a pressure side 24 and a suction side 25 between the two edges. A plurality of cooling passages 14, 15, 16 and 17 extend inside the blade airfoil 11 in the radial direction. A cooling medium from the lower part 13 of the blade enters (arrow) the cooling passage 15 and 16, flows towards the blade tip 12, is deflected there by 180° within the limits of a flow reversal 18, and in the cooling passage 14 flows back towards the lower part 13 of the blade and through small cooling passages to the trailing edge 22. The cooling medium which enters the cooling passage 16 finds its way through passages 19 into the adjacent cooling passage 17, and from there discharges outwards through outlet openings 20, 23 in order to cool the blade, for example in the manner of film cooling, on the outer side.

When designing the thermally loaded component (in this case, the turbine blade), the cooling capacity is customarily intensified by provision being made in the cooling passages for different types of obstacles, or by openings or slots of different configuration being arranged between adjacent cooling passages or opposite walls which are to be cooled. These geometric elements are to create either local turbulences in the flow of cooling medium or to increase convection in a local region in order to increase the heat transfer between a hot internal wall of the component and the colder medium. Even if a highly-complex cooling system is provided inside the component which is to be cooled, which in the case of production can be associated with high costs, certain regions, such as corners inside the component which with regard to effective cooling still constitute a challenge, and which on account of local effects such as oxidation, creep or premature crack development may constitute a service-life problem, still remain.

The cooling system generally comprises one or more inlets for entry of the cooling medium into the hot component, and one or more outlets for discharge of the cooling medium. Depending upon the process of heat transfer between the cooling medium and the hot walls of the component, the cooling system comprises different cavities which are interconnected by means of passages or slots. On account of the different configuration, dimensions, temperatures and pressures in these cavities and passages, different acoustic resonances occur in the cooling system. In general, each cavity and each passage has a different acoustic resonance. When designing the cooling system, attention is paid to keeping the Mach numbers in the flow of the cooling medium through the cooling system within specific upper and lower limits in order to avoid flow separation and regions of poorer heat transfer which are associated therewith.

SUMMARY OF THE INVENTION

An aspect of the invention is to provide a thermally loaded, cooled component which avoids the described disadvantages of known components and is characterized by intensified cooling, which is associated with lower cost, in critical regions.

In an embodiment, the present invention provides a thermally loaded, cooled component thermally coupled to a cooling system configured to receive a gaseous cooling introduced in a forced manner from outside that flows through the cooling system so as to absorb and transport heat away from the component as a result of thermal contact with the component. The component includes at least one Helmholtz resonator configured to improve the thermal contact between the cooling medium and the component.

BRIEF DESCRIPTION OF THE FIGURES

Exemplary embodiments are explained in more detail with reference to the drawings, in which:

FIG. 1 shows two sub-figures 1*a*) and 1*b*) the longitudinal section and the cross section through a turbine blade with internal cooling;

FIG. 2 shows an enlarged detail of the turbine blade from FIG. 1*a*), which shows a corner region which is critical for cooling;

FIG. 3 shows the region of a turbine blade, comparable to FIG. 2, in which by a corresponding modification of the cooling passages interconnected Helmholtz resonators are arranged according to an exemplary embodiment of the invention.

DETAILED DESCRIPTION

Figure 4A:
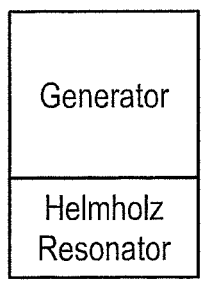
FIGS. 4a-4c show a generator, a motor and a high energy electronic system.
Figure 4B:
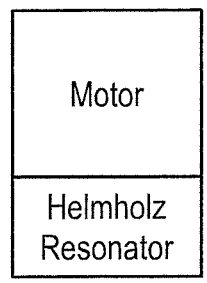
Figure 4C:
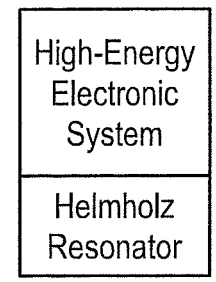

In one embodiment, at least one Helmholtz resonator is in hydraulic communication with the cooling system and is excited into vibrations by means of the flowing cooling medium itself.

In another embodiment, the at least one Helmholtz resonator is integrated into the cooling system.

In another embodiment, a plurality of Helmholtz resonators are arranged next to each other, and in the Helmholtz resonators are hydraulically interconnected in each case by means of a connecting passage for forming an acoustic heat pump.

In another embodiment, the Helmholtz resonator(s) is (are) integrated into the component, and in that the Helmholtz resonator(s) is (are) arranged in the component in regions with particularly high thermal loading.

In a further embodiment the component is part of a heat-generating electric device, especially a generator, a motor or a high-energy electronic system.

In another embodiment the component is part of a heat engine, especially a steam or gas turbine.

In accordance with another embodiment the component is a turbine blade, the turbine blade has a cooled blade airfoil, through the interior of which flows a gaseous cooling medium, and one or more Helmholtz resonators, which are acted upon by the flowing cooling medium, are formed in the interior of the blade airfoil.

In another embodiment, the blade airfoil the turbine blade has a plurality of cooling passages which extend in parallel in the radial direction, and in that the Helmholtz resonator(s) is (are) integrated into the cooling passages.

In another embodiment, the blade airfoil has a leading edge and a trailing edge, and the Helmholtz resonator(s) is (are) arranged in the region of the leading edge.

The present invention provides a locally improved cooling effect by acoustic vibrations being excited in the cooling medium in the corresponding region in the cooling system. Within the scope of the subsequently explained exemplary embodiment, consideration is given to a thermo-acoustic model in which a network of coupled, discrete, non-linear vibrating cavities inside the cooling system is taken as a starting point. The vibrations can be excited by means of the flowing cooling medium itself. It is also conceivable, however, to excite the acoustic vibrations in another way, such as by temperature differences or the like. Depending upon requirement, shape and dimension of a specific cavity can be adapted to the required dimensions of a specific Helmholtz resonator, as becomes clear from a comparison of FIG. 2 (prior art) and FIG. 3 (exemplary embodiment according to the invention).

Reproduced in FIG. 3 is the region of the blade tip of a turbine blade 30, in which in comparison to FIG. 2, in the especially thermally loaded corners 32, the cooling passage 17 is redesigned so that at least two Helmholtz resonators (cavities) 26 and 28 are formed and hydraulically interconnected by means of a connecting passage 31. The Helmholtz resonator 26 is connected to the adjacent flow of the cooling medium by means of a constriction 27, and the Helmholtz resonator 28 is correspondingly connected by means of a slot 29. The configuration and the dimensions of the slot 29 have to be determined with regard to the flow velocity of the cooling medium (arrows) which flows past it.

By selecting suitable dimensions of the cavities and also of the constrictions of the Helmholtz resonators 26 and 28 with regard to the flow parameters of the cooling medium, different intensities of acoustic vibrations can be excited between adjacent resonators. Resulting from this is the phenomenon of the acoustic heat pump, in which heat from the resonator with the lower vibration amplitude is pumped towards the resonator with the higher vibration amplitude.

The transporting of heat between adjacent cavities, which are interconnected by means of a connecting passage (31 in FIG. 3), can be estimated by means of the following equation:

$$\dot{Q} = \left(\frac{S\delta}{4}\right)\frac{1+\sqrt{\sigma}}{1+\sigma} v_c p_c,$$

wherein S refers to the circumference of the surface of the connecting passage (31), δ represents the thermal penetration depth, σ is the Prandtl number, and $p_c$ and $v_c$ are the amplitude of the acoustic vibration and the velocity in the connecting passage (31). The velocity $v_c$ can be calculated to:

$$v_c = \frac{\Delta p}{\omega \rho l_e},$$

wherein Δp is the difference of the vibration amplitudes of the adjacent resonators, ρ refers to the density of the cooling medium, ω represents the angular frequency of the acoustic system, and $l_e$ is the effective length of the connecting passage (31) which is influenced by losses at both ends of the passage.

With a corresponding design and arrangement of the Helmholtz resonators, heat can be "pumped out" from the critical region, which amounts to intensified cooling of this region.

The present invention is not limited to the analytical methods which are described above. Rather, other procedures and methods can also be used in order to achieve improved cooling in an acoustic way in a cooling system with gaseous cooling medium, especially air, of a thermally loaded component. Thus, the necessary acoustic resonance can be produced by modifying an existing geometry of a cooling passage or of a forum.

The acoustic resonances in the cooling system can be based on the shapes of standing waves transversely to the cooling passage or along the cooling passage for low Mach numbers, and specifically 0.2, and/or the shapes of transient waves transversely to the cooling passage or along the cooling passage for higher Mach numbers above 0.3, and/or the shapes of rotating waves along the cooling passage, and also the superposition of these types for improving the cooling effect.

In addition to the configuration and the geometric dimensions, the temperature and the pressure must also be taken into consideration in order to achieve the cooling capacity which is improved in an acoustic way.

The methods for acoustically intensified cooling which are described here can be used with gas turbines both in the intended operating range or outside the operating range, but can also be used with any other machine or device which requires cooling, such as a generator, jet-engine, any type of piston machine, electric motors or actuators. The acoustic resonances, however, taken individually, can also be used as the central element of a cooling process. Such a design can also be used with other components of a gas turbine, such as for cavities of the rotor or of the casing.

LIST OF DESIGNATIONS

10, 30 Turbine blade
11 Blade airfoil
12 Blade tip
13 Lower part of blade
14, 15, 16, 17 Cooling passage
18 Flow reversal
19 Through-opening
20, 23 Outlet opening
21 Leading edge
22 Trailing edge
24 Pressure side
25 Suction side
26, 28 Helmholtz resonator
27 Constriction
29 Slot
31 Connecting passage
32 Corners (especially thermally loaded)

What is claimed is:

1. A turbine blade configured to be thermally loaded and coupled to a cooling system configured to receive a gaseous cooling medium introduced in a forced manner from outside the turbine blade that flows through the cooling system so as to absorb and transport heat away from the turbine blade as a result of thermal contact with the turbine blade, the turbine blade comprising:
   at least one Helmholtz resonator configured to improve thermal contact between the cooling medium and the turbine blade, the at least one Helmholtz resonator including an enclosure having a constricted entrance;
   wherein the turbine blade includes a cooled blade airfoil including an interior through which the gaseous cooling medium flows, and wherein the at least one Helmholtz resonator is disposed in the interior of the blade airfoil; and
   wherein the blade airfoil includes a plurality of cooling passages extending in parallel in a radial direction, and wherein the Helmholtz resonators are integrated into the cooling passages.

2. The turbine blade recited in claim 1, wherein the blade airfoil comprises:
   a leading edge and a trailing edge, and wherein the at least one Helmholtz resonator is disposed in a region of the leading edge.

3. The turbine blade recited in claim 1, wherein the at least one Helmholtz resonator is in fluidic communication with the cooling system and is configured to be excited into vibrations by the flow of the cooling medium.

4. The turbine blade recited in claim 3, wherein the at least one Helmholtz resonator is integrated into the cooling system.

5. The turbine blade recited in claim 1, wherein the at least one Helmholtz resonator includes a plurality of Helmholtz resonators disposed next to each other, each of the plurality of Helmholtz resonators being fluidicaly interconnected by a connecting passage and configured to form an acoustic heat pump.

6. The turbine blade recited in claim 1, wherein the at least one Helmholtz resonator is disposed in a region within the turbine blade configured for particularly high thermal loading.

7. The turbine blade recited in claim 1, wherein the turbine blade is part of a heat engine.

8. The turbine blade recited in claim 7, wherein the heat engine is one of a steam or gas turbine.

\* \* \* \* \*